Patented Mar. 3, 1936

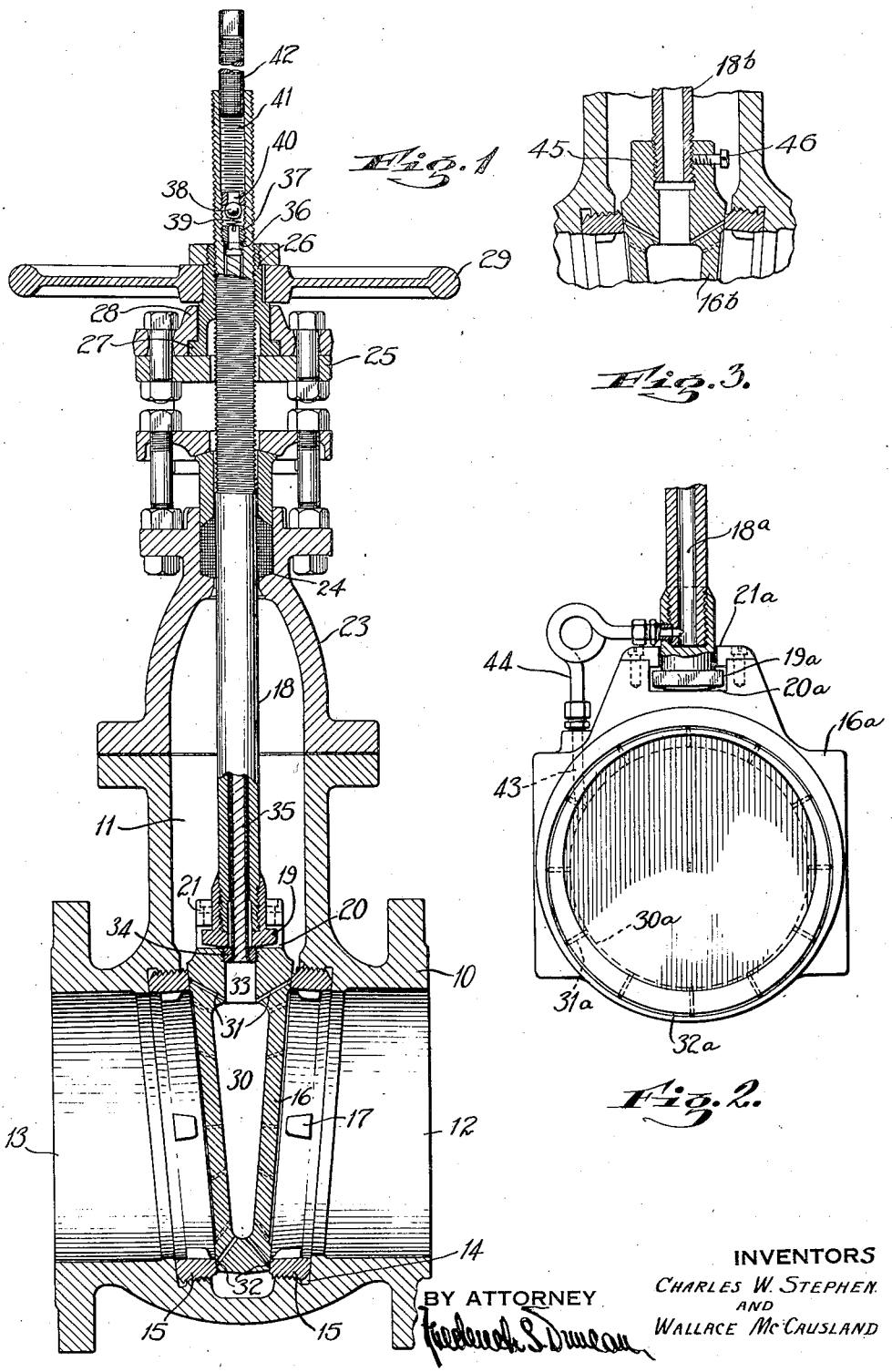

2,032,882

UNITED STATES PATENT OFFICE 2,032,882

LUBRICATED GATE VALVE

Wallace McCausland and Charles W. Stephen, Bridgeport, Conn., assignors to Reading-Pratt & Cady Company, Inc., a corporation of New York Application April 8, 1931, Serial No. 528,567

11 Claims. (Cl. 251—61)

The present invention relates to gate valves and has for an object to provide improved means for overcoming locking or binding of the gate in the seat so that the valve may be operated more easily.

Another object of the invention is to provide a more effective seal between the gate and its seat.

Another object of the invention is to reduce wear on the bearing surfaces.

Another object is to inhibit corrosion of the seating surfaces of the valve.

The invention is particularly useful in wedge type valves of the larger sizes. In such valves the gate is usually forced to its closed position under heavy pressure and this sets up a substantial dragging and abrasive effect which locks or binds the wedge or gate in the valve seats. Such valves are frequently closed when hot and during cooling of the valves unequal expansions take place, sometimes increasing the binding effect. It is, therefore, an object of the present invention to provide means for applying a lubricant between the gate and its seat or seats and to exert pressure upon the lubricant to overcome the binding effect.

A further object of the present invention is to provide a lubricant having corrosion inhibiting qualities and force such lubricant to the seating surface of the valve, thereby not only sealing the joint between said surfaces but protecting said surfaces against corrosion.

In a Patent No. 2,006,715, dated July 2, 1935, is disclosed a valve provided with channeled seat rings and means for introducing lubricant under pressure through said channels between the gate and the seats so as to overcome the binding effect when the valve is being opened, and also to seal the joint between the gate and its seats when the valve is closed.

An object of the present invention is to provide a construction by which lubricant may be fed to the coacting surfaces of the valve through the gate rather than the seat rings.

A more specific object of the invention is to provide a gate valve of wedge type with a lubricating chamber in the wedge and ducts leading therefrom to the opposite operating surfaces of the wedge.

Another object is to provide a gate valve with a hollow valve stem through which lubricant may be fed to the chamber in the gate.

Still another object of the invention is to provide a structure of the type described above in which means are provided at the outer end of the valve stem for exerting pressure on the lubricant therein.

Other objects and advantages of the invention will appear in the following description of certain embodiments thereof and thereafter the novelty and scope of the invention will be pointed out in the claims.

In the accompanying drawing;

Figure 1 is a view in vertical section through the improved lubricated gate valve, certain parts being broken away to reveal interior details;

Fig. 2 is a view in side elevation of a modified form of gate with a portion of a valve stem connected thereto, the rod being broken away to illustrate details of construction; and Fig. 3 is a fragmentary view in section showing another modification.

In Fig. 1 the casing of a gate valve is indicated by the reference numeral 10. The construction of this casing possesses no particular novelty. It comprises a central chamber 11 and a pair of main fluid passages 12 and 13 which open into the chamber. At the inner end of each passage there is a threaded annular recess 14 in which a seat ring 15 is screwed. Lugs 17 on the rings facilitate screwing them into the recesses. The rings are disposed at an acute angle one to the other to permit of introducing a wedge 16 therebetween to close the passages.

The wedge 16 is raised and lowered by means of a hollow stem 18 which at its lower end is provided with a head 19 that enters a slot 20 formed in the top of the wedge. A pair of cheek pieces 21 are fastened to the top of the wedge so as to overlap the head 19. The chamber 11 is closed at the top by means of the usual bonnet 23 through which passes the stem 18. The bonnet carries the usual stuffing box 24 to prevent leakage of fluid around the stem 18. Clamped to the bonnet is a bracket 25 which carries a nut 26 threaded upon the stem 18. This nut is provided with a flange 27 which is engaged by a flange ring 28 clamped to the bracket 25. A hand wheel 29 is keyed to the nut 26 so that by turning this hand wheel the wedge may be raised or lowered to open or close communication between passages 12 and 13.

Formed in the wedge 16 is a chamber 30 adapted to serve as a reservoir for a lubricant. Ducts 31 lead from this chamber to a pair of annular grooves 32 formed respectively in the opposite seating surfaces of the gate. At the upper end of the gate there is a port 33 opening into the chamber 30. In this port a bushing 34 is tightly threaded. Brazed to this bushing is a flexible metallic tube 35 which extends through the hollow stem 18. Secured to the upper end of the tube 35 is a collar 36 which is flanged outwardly to bear against a suitable seat formed in the bore of the stem 18. Above this seat the bore of the stem 18 is enlarged and is threaded to receive a nut 37. The latter is screwed tightly down upon the flanged collar 36, serving to seal the joint between the collar and its seat in the stem 18. A check valve 38 is pressed by a spring 39 against an apertured collar 40 threaded into the stem 18 just above the collar 37. Above the collar 40 the bore of the stem 18 constitutes a chamber 41 for lubricant, in which chamber is threaded a screw plug 42.

In operation, the chamber 30 is filled with lubricant through the outer end of the valve stem 18 and then the screw plug 42 is applied to exert pressure on the lubricant so as to force it through the ducts 31 into the annular groove 32. The lubricant will then find its way between the contacting surfaces of the gate and the seat rings 15. Whenever it is desired to open the valve, if the valve offers material resistance, the screw plug 42 is turned to force the lubricant between the contacting surfaces. The valve stem 18 may have a certain play with respect to the gate 16 without disturbing the connection between the chambers 30 and 41 owing to the flexibility of the tube 35. When forcing the gate valve to its seat a perfect seal of the joint between the gate and the seat rings may be insured by exerting pressure on the lubricant with a turn or two of the screw plug 42.

The construction shown in Fig. 2 is similar to that shown in Fig. 1, except that the flexible shaft 35 is dispensed with, and instead of leading the lubricant directly through the lower end of the stem 18 into the gate it is tapped off laterally and conducted through a flexible lead to the gate. In this figure, parts which are substantially like those in Fig. 1 are indicated by the same reference numerals bearing the suffix "a". Thus the gate 16a is provided with a central chamber 30a from which ducts 31a lead to annular grooves 32a formed respectively in opposite seating faces of the gate. The chamber 30a, however, is provided at one side of its central axis with a port 43. Fitted into this port is a metallic tube 44 which is preferably coiled as indicated in the drawing and then extends at right angles and is connected to the bore of the hollow valve stem 18a. The valve stem 18a is closed at its lower end by means of the head 19a, and the flexible tube 35 with its connections is dispensed with. The tube 44 may be of copper or other suitable metal and because it is coiled it will flex readily to allow for the play of the head 19a between the cheek pieces 21a and the bottom of the slot 20a. As shown in the drawing, each annular groove 32a is preferably struck on a center that is slightly below the center of the seating surface of the valve. The advantage of this is that the lubricant grooves will wipe over a larger area of the seat rings when the valve is raised and lowered. Owing to the inclination of the opposite faces of the gate and the cooperating faces of the seat rings, the pressure exerted by the lubricant on the contacting seating surfaces will produce a lifting effect, tending to raise the gate and thereby facilitating opening of the valve.

Instead of the loose connection between the gate and its stem, a fixed connection may be employed as shown in Fig. 3. In this drawing, the gate is indicated by the reference numeral 16b and the stem by the numeral 18b. The construction of the gate 16b is exactly like that of gate 16 except for the means of attachment to the stem. Thus the gate 16b is formed with a sleeve extension 45. The stem 18b which is hollow is screwed into said extension and a set screw 46 locks the parts together. Owing to the fixed connection between the stem 18b and gate 16b the flexible tube 35 may be dispensed with and lubricant may be pumped through the stem 18b directly into the lubricant reservoir in the gate.

It will be understood that the invention is not limited to the exact constructions described and illustrated but includes such changes in form and construction as fall within the spirit and scope of the following claims.

We claim:

1. A gate for a gate valve, said gate being formed with an annular seating surface, and with an annular groove in the seating surface but eccentric thereto, the gate being hollow to form a reservoir for lubricant and having ducts leading from the reservoir to said groove.

2. In a gate valve having a valve seat, a gate having a seating surface to engage the valve seat and being slidable substantially without rotation to and from said seat, a substantially non-rotary tubular stem, means providing a loose operative connection between the stem and the gate, the gate being hollow to form a chamber for lubricant and having ducts leading from said chamber to the seating surface of the gate, and a flexible tube fixed at one end to the gate and at the other end to the stem and providing communication between the bore of the stem and the chamber.

3. In a gate valve having a valve seat, a gate having a seating surface to engage the valve seat and being slidable substantially without rotation to and from said seat, a substantially non-rotary tubular stem, means providing a loose operative connection between the stem and the gate, the gate being hollow to form a chamber for lubricant and having ducts leading from said chamber to the seating surface of the gate, a flexible tube fixed at one end to the gate and at the other end to the stem and providing communication between the bore of the stem and the chamber, and means in the stem for exerting pressure on the lubricant in the chamber.

4. In a gate valve having a valve seat, a gate having a seating surface to engage the valve seat and being slidable substantially without rotation to and from said seat, a substantially non-rotary tubular stem, means providing a loose operative connection between the stem and the gate, the gate being hollow to form a chamber for lubricant and having ducts leading from said chamber to the seating surface of the gate, a flexible tube fixed at one end to the gate and at the other end to the stem and providing communication between the bore of the stem and the chamber, and a plunger threaded into the outer end of the stem and operable to exert pressure on the lubricant in the stem and the chamber.

5. In a gate valve having a valve seat, a gate having a seating surface to engage the valve seat and being slidable substantially without rotation to and from said seat, a substantially non-rotary tubular stem, means providing a loose operative connection between the stem and the gate, the gate being hollow to form a chamber for lubricant and having ducts leading from said chamber to the seating surface of the gate, a flexible tube fixed at one end to the gate and at the other end to the stem and providing communication between the bore of the stem and the chamber, a plunger threaded into the outer end of the stem and operable to exert pressure on the lubricant in the stem and the chamber, and a check valve in the stem below the plunger and opening toward the chamber.

6. In a gate valve, a gate, a tubular stem closed at its inner end, means providing a loose operative connection between the inner end of the stem and the gate, the gate being hollow, to form a chamber for lubricant and having ducts leading from said chamber to a seating surface of the gate, a resilient coil of tubing connected at one end to the stem and at the other to the gate and providing communication between the bore of the stem and the chamber, and a plunger in the outer end of the stem operable to exert pressure on the lubricant in the stem and the chamber.

7. In a gate valve having a valve seat, a gate having a seating surface to engage the valve seat and being slidable substantially without rotation to and from said seat, a substantially non-rotary tubular stem, means providing a loose operative connection between the stem and the gate, the gate being hollow to form a chamber for lubricant and having ducts leading from said chamber to the seating surface of the gate, a flexible tube in the stem providing communication between the bore of the stem and the chamber, one end of the tube being secured to the gate and the other to the stem, and a plunger operable in the outer end of the stem to exert pressure on the lubricant.

8. In a gate valve having a valve seat, a gate having a seating surface to engage the valve seat and being slidable substantially without rotation to and from said seat, a substantially non-rotary tubular stem, means providing a loose operative connection between the stem and the gate, the gate being hollow to form a chamber for lubricant and having ducts leading from said chamber to the seating surface of the gate, a flexible tube in the stem providing communication between the bore of the stem and the chamber, one end of the tube being secured to the gate and the other to the stem, a plunger operable in the outer end of the stem to exert pressure on the lubricant, and a check valve below the plunger and opening toward the chamber.

9. In a gate valve having a valve seat, a gate having a seating surface to engage the valve seat and being slidable substantially without rotation to and from engagement with said seat, a substantially non-rotary operating stem therefor and having flexible connection therewith, the gate being hollow to provide a chamber for lubricant and having ducts leading from the chamber to a seating surface of the gate, the stem being formed with an axial bore, and means providing a fluid tight connection between the bore and the chamber for feeding lubricant through the stem into the chamber.

10. In a gate valve having a valve seat, a gate having a seating surface to engage the valve seat and being slidable substantially without rotation to and from said seat, a substantially non-rotary tubular stem therefor, the gate being hollow to provide a chamber for a sealing fluid and having ducts leading from said chamber to a seating surface of the gate, the fluid tight connection between the stem and gate providing communication between the bore of the stem and said chamber, said connection also permitting limited relative movement of the gate and stem, and means in the stem for exerting pressure on the fluid in the chamber to force such fluid through the ducts to said seating surface of the gate.

11. In a gate valve, a gate, a stem therefor, connecting means between the stem and gate constructed and arranged to provide for limited lateral shifting as well as limited angular movement of the gate with respect to the stem, the gate being hollow to provide a chamber for lubricant and having ducts leading from the chamber to a seating surface of the gate, the stem being formed with an axial bore, and means providing a fluid-tight connection between the bore and the chamber for feeding lubricant through the stem into the chamber.

WALLACE McCAUSLAND.
CHARLES W. STEPHEN.